United States Patent
Hayashi et al.

(10) Patent No.: US 8,454,075 B2
(45) Date of Patent: Jun. 4, 2013

(54) FRONT PORTION STRUCTURE OF SADDLE-RIDE TYPE VEHICLE

(75) Inventors: Kazuhito Hayashi, Saitama (JP); Hirotsugu Ueno, Saitama (JP); Hiroaki Tsukui, Saitama (JP); Manabu Ichikawa, Saitama (JP); Takahiro Oyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 13/035,548

(22) Filed: Feb. 25, 2011

(65) Prior Publication Data

US 2011/0149587 A1 Jun. 23, 2011

Related U.S. Application Data

(62) Division of application No. 12/968,892, filed on Dec. 15, 2010.

(30) Foreign Application Priority Data

Dec. 17, 2009 (JP) ................................. 2009-285862
Oct. 26, 2010 (JP) ................................. 2010-240119

(51) Int. Cl.
   *B62J 17/04* (2006.01)
(52) U.S. Cl.
   USPC ...................................................... 296/78.1
(58) Field of Classification Search
   USPC . 180/903; 296/77.1, 78.1, 192, 208; 359/550; 362/473, 475, 476
   See application file for complete search history.

(56) References Cited

U.S. PATENT DOCUMENTS

| 2,248,460 | A | * | 7/1941 | Kraeft | 362/476 |
|---|---|---|---|---|---|
| 3,979,147 | A | * | 9/1976 | Kelley | 296/78.1 |
| 4,066,291 | A | * | 1/1978 | Hickman | 296/78.1 |
| 5,409,287 | A | * | 4/1995 | Suzuki | 296/180.1 |
| 6,276,482 | B1 | * | 8/2001 | Moriya et al. | 180/229 |
| 6,979,039 | B2 | * | 12/2005 | Takemura et al. | 296/78.1 |
| 7,401,953 | B2 | * | 7/2008 | Isayama | 362/474 |
| 7,510,229 | B2 | * | 3/2009 | Katagiri et al. | 296/78.1 |
| 7,556,115 | B2 | * | 7/2009 | Iwanaga | 180/229 |
| 7,628,517 | B2 | * | 12/2009 | Domoto et al. | 362/475 |
| 7,674,023 | B2 | * | 3/2010 | Ohira | 362/475 |
| 7,762,609 | B2 | * | 7/2010 | Mochizuki | 296/78.1 |
| 7,766,522 | B2 | * | 8/2010 | Suita | 362/475 |
| 8,123,273 | B2 | * | 2/2012 | Tsuda et al. | 296/78.1 |
| 2006/0087144 | A1 | * | 4/2006 | Kamimura et al. | 296/78.1 |
| 2007/0236949 | A1 | * | 10/2007 | Kurihara | 362/475 |

(Continued)

FOREIGN PATENT DOCUMENTS

| EP | 1457412 A2 * | 9/2004 |
|---|---|---|
| JP | 01229785 A * | 9/1989 |

(Continued)

*Primary Examiner* — Glenn Dayoan
*Assistant Examiner* — Paul Chenevert
(74) *Attorney, Agent, or Firm* — Birch, Stewart, Kolasch & Birch, LLP

(57) ABSTRACT

A front portion structure of a saddle-ride type vehicle which is constructed to install a combination lamp on a front cowl and improve visibility of a blinker of one of left and right sides of the vehicle from the other side, wherein Lens-side recess portions are formed as concavities which are recessed to the rear of the vehicle and extend in a vertical direction in front of the blinker lamps as well as on the inner side of a vehicle width direction.

4 Claims, 11 Drawing Sheets

U.S. PATENT DOCUMENTS

2008/0239737 A1* 10/2008 Aoki ........................... 362/475
2009/0108630 A1* 4/2009 Nakao et al. .................. 296/192
2012/0104787 A1* 5/2012 Tsukui et al. ................ 296/78.1

FOREIGN PATENT DOCUMENTS

| JP | 02053681 A | * | 2/1990 |
| JP | 03061187 A | * | 3/1991 |
| JP | 03065483 A | * | 3/1991 |
| JP | 03273949 A | * | 12/1991 |
| JP | 04092732 A | * | 3/1992 |
| JP | 05139354 A | * | 6/1993 |
| JP | 05238454 A | * | 9/1993 |
| JP | 06048344 A | * | 2/1994 |
| JP | 06206586 A | * | 7/1994 |
| JP | 2008-265625 A | | 11/2008 |
| JP | 2009-234479 A | | 10/2009 |

* cited by examiner

US 8,454,075 B2

FRONT PORTION STRUCTURE OF SADDLE-RIDE TYPE VEHICLE

CROSS-REFERENCE TO RELATED APPLICATIONS

The present application is a divisional application which claims priority to U.S. patent application Ser. No. 12/968,892 filed on Dec. 15, 2010, which claims priority under 35 USC 119 to Japanese Patent Application No. 2009-285862 filed on Dec. 17, 2009 and Japanese Patent Application No. 2010-240119 filed on Oct. 26, 2010 the entire contents of which are hereby incorporated by reference.

BACKGROUND OF THE INVENTION

1. Field of the Invention

The present invention relates to a front portion structure of a saddle-ride type vehicle.

2. Description of Background Art

Motorcycles with a screen are known, in which a pair of left and right headlights is installed on a front cowl, and the front cowl is provided with a windscreen extending rearwardly and upwardly from an upper portion thereof. In this kind of vehicle, an air guide structure is disclosed, in which an air guide hole is formed between a lower edge of the windscreen and the front cowl in an area (a central portion of the front cowl) sandwiched between the pair of left and right headlights of the front cowl. A flow of air is guided into a space between the front cowl and the windscreen via the air guide hole. See, for example, JP-A No. 2008-265625. According to such a structure, part of the flow of air is guided toward a rear side of the windscreen, which can prevent the rear side of the windscreen from being under negative pressure and inhibit the trapping of the flow of air.

Furthermore, motorcycles having a combination lamp in which a headlamp, blinker lamps, and a lens continuing to the front of the headlamp and blinker lamp are integrally disposed on a front cowl are also known. This kind of combination lamp has a structure where the blinker lamps are disposed above the left and right of the headlamp, and front lighting devices are compactly disposed. See, for example, JP-A No. 2009-234479.

However, in the conventional structure disclosed in JP-A No. 2008-265625, when the air guide structure is formed at the central portion of the front cowl, a light emitting area of the headlight is reduced by the air guide structure, or a shape or layout of the headlight is restricted by the air guide structure.

Further, in the conventional structure disclosed in JP-A No. 2009-234479, the front cowl is adapted to be rearwardly widened from the front of the vehicle body toward the outside of a width direction of the vehicle, and the left and right blinker lamps of the headlight are disposed along the front cowl. As such, the left and right blinker lamps are located inside the lens portion of the headlight or the cowl portion around the headlight.

For this reason, when viewed at an angle from the front right side of the vehicle, the left blinker lamp is hidden from the lens or cowl portion, so that it is difficult to see the left blinker lamp. When viewed at an angle from the front left side of the vehicle, it is difficult to see the right blinker lamp. When the vehicle is viewed from the right or left side, it is more preferable if the opposite blinker lamp is also visible.

SUMMARY AND OBJECTS OF THE INVENTION

The present invention has been made in view of the above-described circumstances, and an object of an embodiment of the invention is to provide a front portion structure of a saddle-ride type vehicle which is constructed to install a combination lamp on a front cowl and improves visibility of a blinker lamp of one of left and right sides of the vehicle from the other side.

In order to address the above-described problems, the present invention provides a front portion structure of a saddle-ride type vehicle, which includes a combination lamp that is disposed at a front portion of the vehicle and has a headlamp (42), blinker lamps (43), and a lens (41B) continuing in front of the headlamp (42) and the blinker lamps (43), wherein the lens (41B) includes concavities (51), which are recessed to a rear of the vehicle and extend in a vertical direction, in front of the blinker lamps (43) as well as on an inner side of a width direction of the vehicle.

According to this construction, since the lens includes the concavities, which are recessed to the rear of the vehicle and extend in the vertical direction, in front of the blinker lamps as well as on the inner side of the vehicle width direction, it is possible to improve the visibility of the blinker lamp of one of the left and right sides of the vehicle from the other side due to a structure where the combination lamp is installed on the front cowl.

In the aforementioned construction, the concavities (51) may each be formed throughout a vertical width of each of blinker chambers (43A) in which the blinker lamps (43) are held. According to this construction, it is possible to longitudinally prolong the light emitting surface of the blinker as long as possible, and further enhance visibility.

Further, in the aforementioned construction, the concavities (51) may be formed with a width that decreases as they extend toward the rear of the vehicle, and innermost portions (51A) located on a rearmost side of the vehicle body may each be offset toward an outside of the vehicle width direction. According to this construction, it is possible to incline the outer portions (51C) of the recess portions toward the inner side of the vehicle width direction to the utmost, and further improve the visibility of the blinker of one of the left and right sides from the other side.

Further, in the aforementioned construction, position lamps (44) may be provided in the rear of the concavities (51). According to this construction, it is possible to effectively use dead spaces of the rear of the recess portions.

Further, according to an embodiment of the present invention a front portion structure of a saddle-ride type vehicle, which includes a front cowl (31) covering a front portion of a vehicle body; and a combination lamp that is disposed at the front cowl (31) and has a headlamp (42), blinker lamps (43), and a lens (41B) exposing the front cowl (31) between the headlamp (42) and the blinker lamps (43) to cover each lamp, wherein the front cowl (31) exposed between the headlamp (42) and the blinker lamps (43) and the lens (41B) covering the blinker lamps (43) define concavities (51), which are recessed to a rear of the vehicle and extend in a vertical direction, in front of the blinker lamps (43) as well as on an inner side of a width direction of the vehicle.

According to this construction, since the front cowl exposed between the headlamp and the blinker lamps and the lens covering the blinker lamps define the concavities, which are recessed to the rear of the vehicle and extend in the vertical direction, in front of the blinker lamps as well as on the inner side of the vehicle width direction, it is possible to improve the visibility of the blinker of one of the left and right sides of the vehicle from the other side.

According to an embodiment of the present invention, since the lens includes the concavities, which are recessed to the rear of the vehicle and extend in the vertical direction, in front of the blinker lamps as well as on the inner side of the vehicle width direction, it is possible to improve the visibility of the blinker of one of the left and right sides of the vehicle from the other side due to a structure where the combination lamp is installed on the front cowl.

Further, if the concavities are each formed throughout the vertical width of each of blinker chambers in which the blinker lamps are held, it is possible to longitudinally prolong the light emitting surface of the blinker as long as possible, and further enhance visibility.

Further, if the concavities are formed with the width that decreases as they extend toward the rear of the vehicle, and if the innermost portions located on the rearmost side of the vehicle body are offset toward the outside of the vehicle width direction, it is possible to incline the outer portions of the recess portions toward the inner side of the vehicle width direction to the utmost, and further improve the visibility of the blinker of one of the left and right sides from the other side.

Further, if the position lamps are provided in the rear of the concavities, it is possible to effectively use the dead spaces of the rear of the recess portions.

In addition, since the front cowl exposed between the headlamp and the blinker lamps and the lens covering the blinker lamps define the concavities, which are recessed to the rear of the vehicle and extend in the vertical direction, in front of the blinker lamps as well as on the inner side of the vehicle width direction, it is possible to improve the visibility of the blinker of one of the left and right sides of the vehicle from the other side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled In the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the drawings. Note that, throughout the description below, the directions used to refer to the terms "front," "rear," "left," "right," "up" and "down" are identical to the direction of the vehicle body unless otherwise specified.

Figure 1:
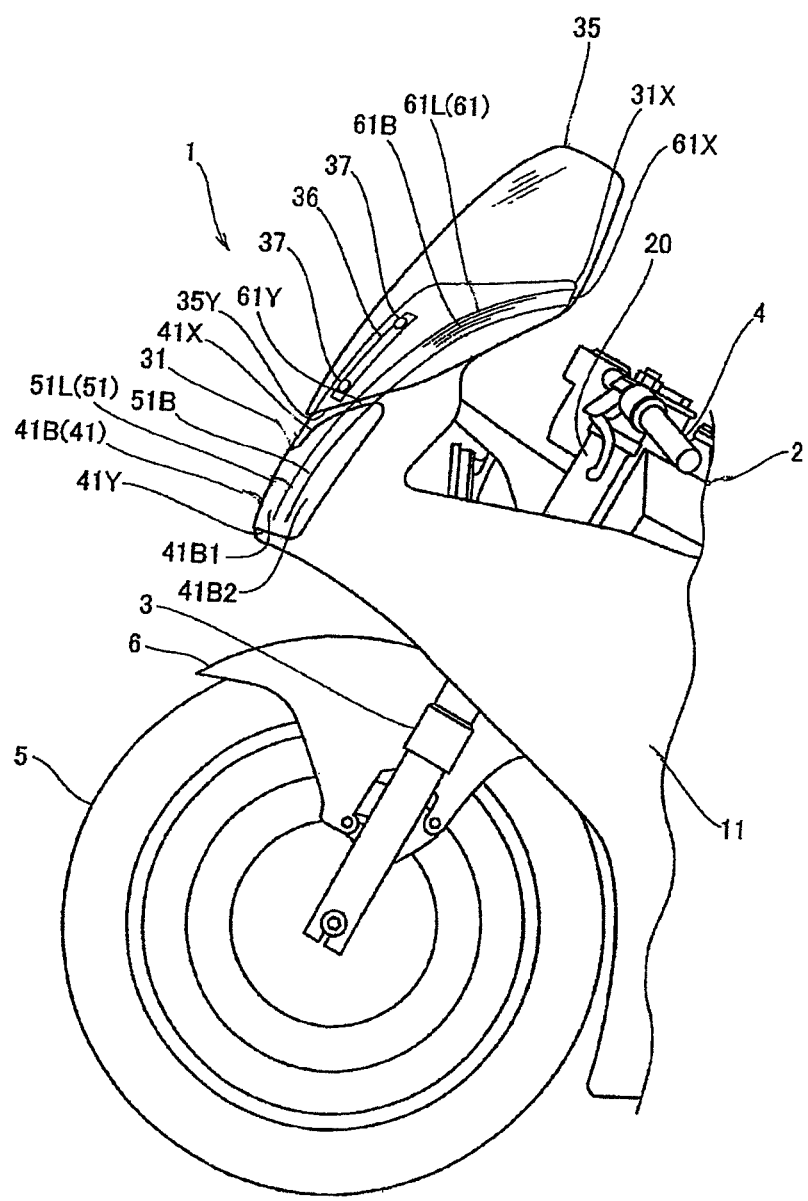
FIG. 1 is a side view showing a front portion of a motorcycle according to a first embodiment of a saddle-ride type vehicle of the present invention.

FIG. 1 is a side view showing a front portion of a motorcycle according to a first embodiment of a saddle-ride type vehicle of the present invention. The motorcycle 1 includes a vehicle body frame 2, a pair of left and right front forks 3 steerably supported by head pipes 20 of the vehicle body frame 2, a steering handlebar 4 mounted on upper ends of the front forks 3 and located at a front upper portion of a vehicle body, a front wheel 5 rotatably supported by the front forks 3, a front fender 6 covering an upper side of the front wheel 5, and a vehicle body cowl (also referred to as a "cowling") 11 covering the vehicle body.

Meanwhile, in the vehicle body frame 2, an engine is supported at the rear of the front wheel 5, and a rear wheel as a driving wheel is supported at the rear of the engine via swing arms (also referred to as "rear forks"). Further, a seat for an occupant which is supported by the vehicle body frame 2 is installed at the rear of the handlebar 4, and a rider takes the seat for the occupant. Thereby, the rider performs maneuvers such as handlebar steering.

The vehicle body cowl 11 is formed by injection molding of a material having rigidity such as a synthetic resin. The vehicle body cowl 11 includes a front cowl 31 covering the front portion of the vehicle body frame 2. The front cowl 31 is supported by the head pipes 20 via a cowl bracket (not shown).

The front cowl 31 is disposed so as to cover the front of the head pipes 20, and is provided with a headlight 41 at the center of a width direction of the vehicle of a front surface thereof. A windscreen 35 is installed on an upper portion of the front cowl 31 which corresponds to an upper side of the headlight 41.

The front cowl 31 has a forwardly swollen shape that is rearwardly widened from a front end thereof toward the outside of the vehicle width direction, and is formed in a shape that reduces air resistance.

Figure 2:
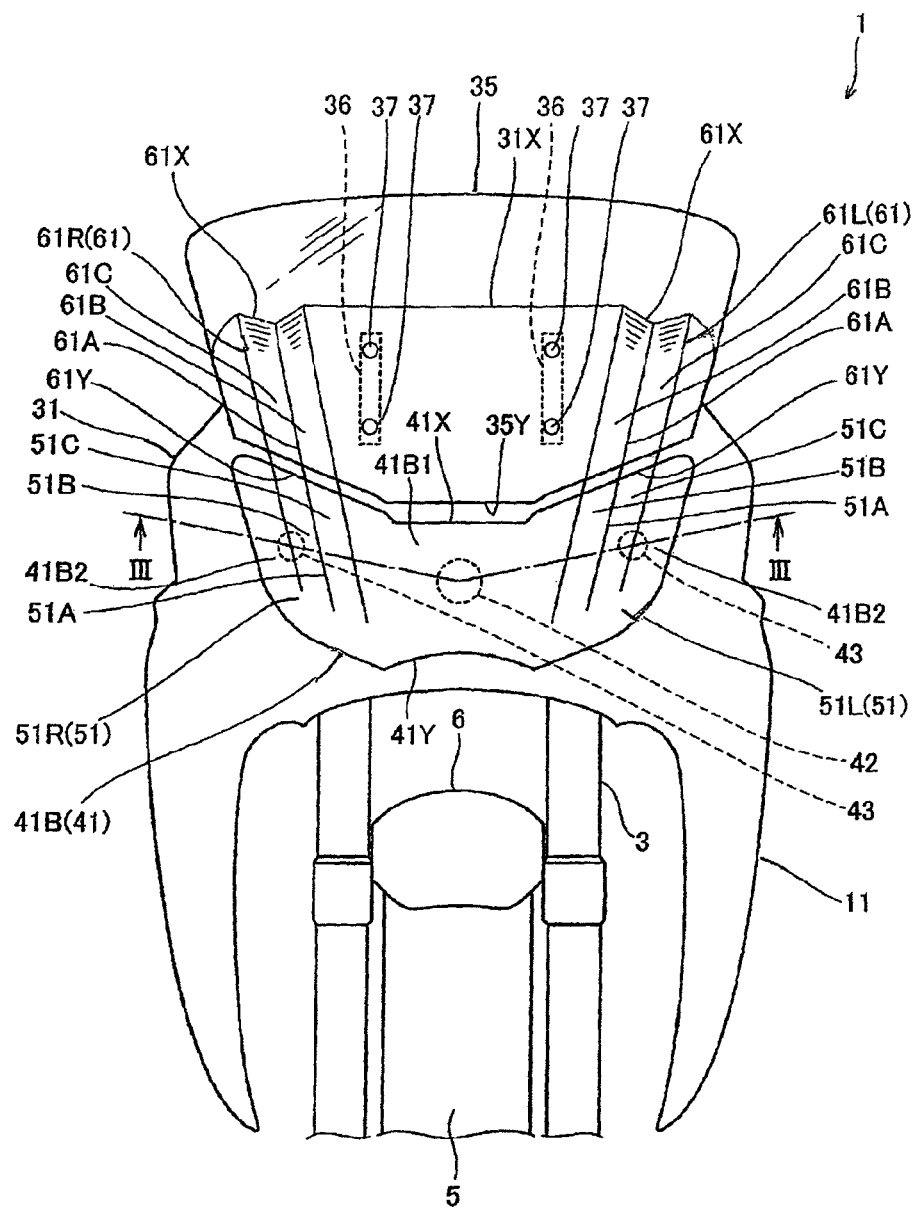
FIG. 2 is a front view showing a front cowl along with its surrounding construction.

FIG. 2 is a front view showing the front cowl 31 along with its surrounding construction.

The windscreen 35 is formed of a transparent material such as a transparent resin. As shown in FIGS. 1 and 2, the windscreen 35 is mounted to the front cowl 31 via a pair of left and right screen support stays (stay portions) 36 and bolts 37. As shown in FIG. 1, the windscreen 35 extends rearwardly and upwardly from the vicinity of an upper edge 41X of the headlight 41 of the front cowl 31 along a front surface of the front cowl 31, and extends upwardly beyond an upper edge 31X of the front cowl 31, so that it is located in front of the torso of the occupant.

As shown in FIG. 2, the windscreen 35 is formed as a large wide windscreen that extends upwardly in a shape that is almost the same width as the front surface of the front cowl 31. For this reason, the windscreen 35 widely covers the torso of the occupant, and thus can achieve the effects of sufficient wind protection (effects of reducing wind pressure or noise to the occupant, and regulating the flow of air).

In the case of the construction where the windscreen 35 is stay-supported on the front surface side of the front cowl 31, the related art is adapted to allow the flow of air to be sufficiently introduced into a rear pattern of the windscreen with a wide gap (clearance) between the windscreen and the front cowl in order to prevent a space between the windscreen and the occupant (i.e., rear side of the windscreen) from being under negative pressure.

By contrast, the present construction is adapted so that, in comparison with the construction of the related art, the gap between the windscreen 35 and the front cowl 31, particularly the gap between the rear surface of the windscreen 35 and the front surface of the front cowl 31, is made smaller than that of the related art, and that this gap is set to a minimum gap capable of preventing the windscreen 35 to rub on the front cowl 31 due to the vibration of the vehicle body during operation of the vehicle.

Further, to be able to avoid damage caused by the vibration, the windscreen 35 may be in close contact with the front cowl 31, without being limited to the construction where the windscreen 35 becomes close to the front cowl 31.

The headlight 41 is formed as a transversely long headlight that is close to a lower edge 35Y of the windscreen 35 on a lower side of the windscreen 35 and extends along the lower edge 35Y in the vehicle width direction.

This headlight 41 is disposed with the center of the width direction of the headlight 41 in alignment with the center of the vehicle width direction, and extends left and right from the center of the vehicle width direction on the front surface of the front cowl 31 when viewed from the front of the vehicle body. A light emitting surface (a lens surface) of the headlight 41 continues on almost the same surface as the front surface of the front cowl 31, and the front surface of the front cowl 31 is formed into one surface (flush surface).

However, in the conventional structure where the air guide structure is provided at the central portion of the front cowl and the headlight is disposed without interference with the air guide structure, the headlight is restricted by the light emitting area, shape, and layout.

For this reason, in the present construction, a lens 41B of the headlight 41 is adapted to provide a pair of left and right lens-side recess portions 51L and 51R that are recessed toward the vehicle rear side, and the front cowl 31 is adapted to provide a pair of left and right cowl-side recess portions 61L and 61R that continue to the pair of left and right lens-side recess portions 51L and 51R and extend upwardly from the rear side of the windscreen 35. Hereinafter, the air guide structure of the present construction will be described in detail along with its surrounding construction.

Figure 3:
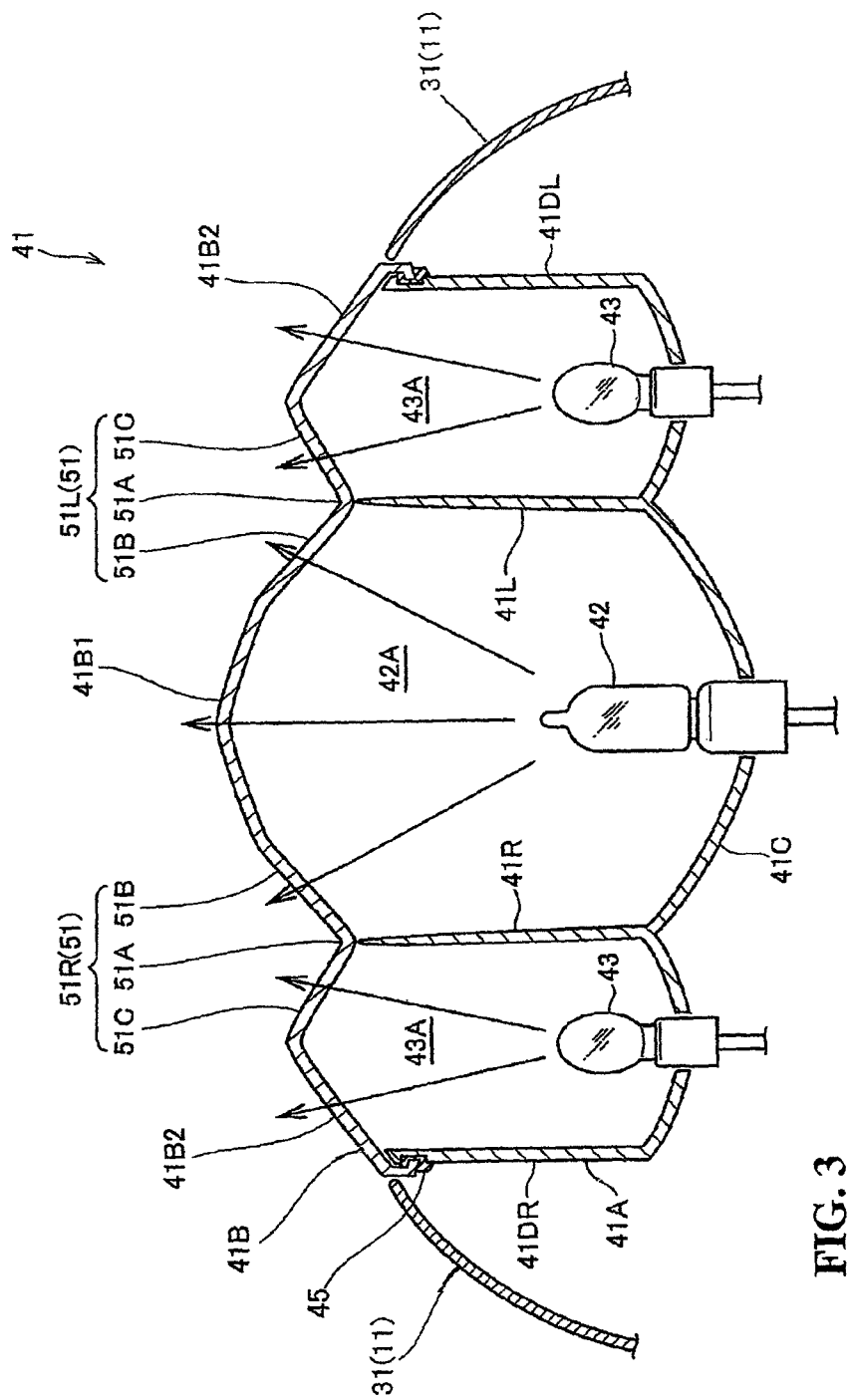
FIG. 3 is a cross-sectional view taken along line of FIG. 2.

FIG. 3 is a cross-sectional view taken along line of FIG. 2.

As shown in FIGS. 2 and 3, the headlight 41 is configured of a single combination lamp that includes a headlamp 42 that is a lighting body illuminating the front at the center of the vehicle width direction and blinker lamps 43 as lighting bodies for blinkers on the left and right of the headlamp 42.

The headlight 41 includes a housing 41A as a resin transversely long case on which the headlamp 42 and the blinker lamps 43 are mounted, and a lens 41B which is formed of a transparent resin (or glass) and is attached so as to cover a front surface of the housing 41A.

The housing 41A is integrally formed with left and right partition walls 41L and 41R that separate a headlamp chamber 42A in which the headlamp 42 is held from left and right blinker chambers 43A in which the left and right blinker lamps 43 are held, respectively.

The left and right partition walls 41L and 41R extend from a housing rear wall 41C along housing sidewalls 41DL and 41DR in a forward and vertical direction, thereby independently separating the lamp chambers 42A and 43A from each other in the vehicle width direction and independently irradiating irradiation light (indicated by solid line arrows in FIG. 3) of the lamps 42 and 43 in a forward direction. When viewed from the front of the vehicle body, these partition walls 41L and 41R are formed as slanted partition walls that are outwardly widened in the vehicle width direction as they extend upward, and the pair of left and right lens-side recess portions 51L and 51R extends along the partition walls 41L and 41R (see FIG. 2).

The surfaces (left and right surfaces) of the partition walls 41L and 41R are formed with reflector surfaces (planes of reflection) by, for instance, aluminum deposition, and thus reflect the irradiation light of the lamps 42 and 43 to irradiate the reflected light toward the outside (the front of the vehicle body) with high efficiency.

Further, such reflector surfaces (planes of reflection) are also formed on inner surfaces of the housing 41A which are exposed to the lamp chambers 42A and 43A (a front surface of the housing rear wall 41C, inner surfaces of the housing sidewalls 41DL and 41DR in the vehicle width direction, etc.) by, for instance, aluminum deposition, without being limited to the surfaces of partition walls 41L and 41R.

The lens 41B is formed as a transversely long single part that covers the front of all the lamp chambers 42A and 43A formed in the housing 41A. The lens 41B is connected to a front end of the housing 41A so as to cover a front opening of the housing 41A, and a seal member 45 is sandwiched between the lens 41B and the housing 41A to prevent penetration of, for instance, rainwater.

As shown in FIGS. 2 and 3, the pair of left and right lens-side recess portions 51L and 51R that is recessed toward the rear side of the vehicle body is provided in a front surface of the lens 41B. These lens-side recess portions 51L and 51R are integrally formed when the lens 41B is formed of a resin, and extend upwardly from a position higher than the lower edge of the lens 41B to the upper edge of the lens 41B. Upper ends of the lens-side recess portions 51L and 51R form a gap between the front cowl 31 and the windscreen 35, and continue to lower open ends 61Y of the pair of left and right cowl-side recess portions 61L and 61R extending rearwardly and upwardly.

As such, when the vehicle body is being operated, the flow of air from the front of the vehicle body flows through the left and right lens-side recess portions 51L and 51R and then between the front cowl 31 and the windscreen 35 along the left and right cowl-side recess portions 61L and 61R, and is smoothly introduced into the space of the rear side of the windscreen 35.

More specifically, the left and right lens-side recess portions 51L and 51R function as air guide recess portions that guide air to the rear side of the windscreen 35. Thereby, the air guide structure is formed.

Further, since the lens-side recess portions 51L and 51R extend upwardly from a position higher than the lower edge 41Y of the lens 41B, no irregularity is present on the side of the lower edge 41Y of the lens 41B. For this reason, the lower edge 41Y of the lens 41B and the front cowl 31 can easily continue without a height difference therebetween.

The lens 41B will be described in more detail. The lens 41B includes a central lens part 41B1 extending left and right from the center of the width direction thereof, a pair of left and right lens-side recess portions 51L and 51R located left and right of the central lens part 41B1, and a pair of left and right outer lens parts 41B2 extending from the pair of left and right lens-side recess portions 51L and 51R toward the outside of the width direction. The lens-side recess portions 51L and 51R are formed in a symmetrical shape about the center of the vehicle width direction. If it is unnecessary to particularly distinguish the lens-side recess portions 51L and 51R from each other in the following description, the lens-side recess portions 51L and 51R will be referred to as lens-side recess portions 51.

The central lens part 41B1 is located in front of the headlamp 42, and forms a forwardly swollen slope that is inclined from the center of the vehicle width direction toward the outside of the vehicle width direction as well as the rear.

Moreover, when viewed from the horizontal cross section, each of the pair of left and right lens-side recess portions 51 has a V-shaped cross section whose width is as narrow as the rear side of the vehicle body, and includes an inner slanted portion (first slanted portion) 51B, which is inclined from an innermost portion 51A located on the rearmost side of the vehicle body toward the inner side of the vehicle width direction as well as the front and forms an inner slope (first slope) connected to the central lens part 41B1, and an outer slanted portion (second slanted portion) 51C, which is inclined from an innermost portion 51A toward the outer side of the vehicle width direction as well as the front and forms an outer slope (second slope) connected to the outer lens part 41B2.

Further, the pair of left and right outer lens parts 41B2 form slopes inclined toward the outer side of the vehicle width direction as well as the rear.

More specifically, in the present construction, as indicated by the solid line arrows for the irradiation light in FIG. 3, the irradiation light of the headlamp 42 is irradiated in the forward direction (including an anterolateral direction) through the central lens part 41B1 and the inner slanted portions 51B that are portions of the left and right lens-side recess portions 51. Further, the irradiation light of the left and right blinker lamps 43 is irradiated in the forward direction through the left and right outer lens parts 41B2 and the outer slanted portions 51C that are the other portions of the left and right lens-side recess portions 51.

In this case, since a forwardly swollen lens surface widened in the horizontal direction is formed by the central lens part 41B1 and the left and right inner slanted portions 51B, it is possible to set an irradiation range of the headlamp 42 to be wide in the horizontal direction and effectively scatter the light of the headlamp.

Further, since forwardly swollen lens surfaces widened in the horizontal direction are formed by the left and right outer lens parts 41B2 and the left and right outer slanted portions 51C, it is possible to effectively scatter the light of the blinker lamps, and improve visibility from the surroundings.

The innermost portions 51A of the left and right lens-side recess portions 51L and 51R approach front ends of the partition walls 41L and 41R, and extend along the corresponding partition walls 41L and 41R. For this reason, when viewed from the front of the vehicle body, the lens-side recess portions 51L and 51R become slanted air guide recess portions that are inclined upwardly and to the outside of the vehicle width direction (see FIG. 2).

According to this construction, using the inner and outer slanted portions 51B and 51C defining a pair of slopes forming each lens-side recess portion 51, it is possible to horizontally widen the irradiation ranges of the headlamp 42 and the blinker lamps 43, hide the partition walls 41L and 41R from the outside due to the left and right innermost portions 51A, and improve appearance.

Next, the pair of left and right cowl-side recess portions 61L and 61R of the front cowl 31 will be described. These cowl-side recess portions 61L and 61R are also formed in a symmetrical shape about the center of the vehicle width direction. If it is unnecessary to particularly distinguish the cowl-side recess portions 61L and 61R from each other in the following description, the cowl-side recess portions 61L and 61R will be referred to as cowl-side recess portions 61.

These cowl-side recess portions 61 are integrally formed when the front cowl 31 is formed of a resin. As shown in FIGS. 1 and 2, the cowl-side recess portions 61 continue from the upper edge 41X of the lens 41B to the upper edge 31X of the front cowl 31, and have a recess shape that is recessed toward the rear of the vehicle body. The cowl-side recess portions 61 having the same cross-sectional shape as the lens-side recess portions 51 on the side of the lens 41B, cause the left and right of the screen support stays 36 of the front cowl 31 to extend in a vertical direction, and are formed as slanted air guide recess portions that are inclined upwardly and to the outside of the vehicle width direction.

To be more specific, when viewed from the front of the vehicle body (see FIG. 2), the left and right cowl-side recess portions 61 are linear slanted recess portions that continue to the left and right lens-side recess portions 51 of the lens 41B, and have their upper edges 61X aligned with the upper edge 31X of the front cowl 31. When viewed from the side of the vehicle body (see FIG. 1), the left and right cowl-side recess portions 61 are recessed so that they extend downwardly along the front cowl 31, and include innermost portions 61A that continue to the innermost portions 51A of the lens-side recess portions 51, and inner and outer slanted portions 61B and 61C that continue to the inner and outer slanted portions 51B and 51C of the lens-side recess portions 51, respectively.

For this reason, the flow of air introduced from the left and right lens-side recess portions 51 of the lens 41B flows to the left and right of the rear side of the windscreen 35, so that it can be widely supplied to the spaces between the occupant and the left and right of the rear side of the windscreen 35. Further, since the left and right cowl-side recess portions 61 extend to the upper edge 31X of the front cowl 31, the flow of air can be sufficiently supplied to the rear side of the front cowl 31.

Thereby, it is possible to effectively prevent a situation where the space between the windscreen 35 and the occupant is under negative pressure, and inhibit the trapping of the flow of air. Further, using the left and right spaces of the screen support stays 36, the cowl-side recess portions 61 are installed on the side of the front cowl 31, so that it is easy to change the design of the width, shape, etc. of the cowl-side recess portions 61 within a range of the empty space concerned.

As described above, according to the present embodiment, the lens-side recess portions 51 that are recessed toward the rear of the vehicle are provided to the lens 41B of the headlight 41, and the corresponding lens-side recess portions 51 are formed so as to continue to the lower open ends 61Y of the cowl-side recess portions 61 that form the gap between the front cowl 31 and the windscreen 35, so that air can be sufficiently guided to the rear side of the windscreen 35.

Furthermore, in this construction, since the lens 41B itself of the headlight 41 is used as the air guide structure, the air guide structure does not restrict any of the light emitting area, shape, layout, etc. of the headlight 41, and it is possible to increase the light emitting area of the headlight 41 and secure the degree of freedom in the shape and layout of the headlight 41.

Further, in the present construction, since the lens-side recess portions 51 are formed on the left and right sides of the lens 41B, it is possible to widely guide the flow of air to the rear side of the windscreen 35. In comparison with the air guide structure provided at the center of the vehicle width direction, even without separately providing a structure for left and right spreading, it is possible to easily spread the introduced flow of air in a horizontal direction.

In addition, since the lens-side recess portions 51 are formed so as to follow the partition walls 41L and 41R that separate the headlamp chamber 42A from the blinker chambers 43A, it is possible to increase the irradiation ranges of the headlamp 42 and the blinker lamps 43 using the inner and outer slanted portions 51B and 51C constituting the pair of slopes forming the lens-side recess portions 51, and effectively scatter the irradiation light. Further, it is possible to hide the partition walls 41L and 41R from the outside due to the lens-side recess portions 51.

Furthermore, in the present construction, since the front cowl 31 is provided with the cowl-side recess portions 61 that are recessed so as to continue to the lens-side recess portions 51 of the headlight 41, form the gap between the front cowl 31 and the windscreen 35, and extend rearwardly and upwardly, it is possible to perform the air guide to the rear side of the windscreen 35 with high efficiency and further enhance air guiding effects.

In this manner, in the present construction, since an air guide passage to the rear side of the windscreen 35 can be positively secured by the recess portions 51 and 61, it is possible to sufficiently guide the air to the rear side of the windscreen 35 even if the gap (clearance) between the windscreen 35 and the front cowl 31 is narrower compared to the related art or is next to zero. More specifically, according to the present construction, it is possible to increase the degree of freedom in design of the gap between the windscreen 35 and the front cowl 31.

Figure 4:
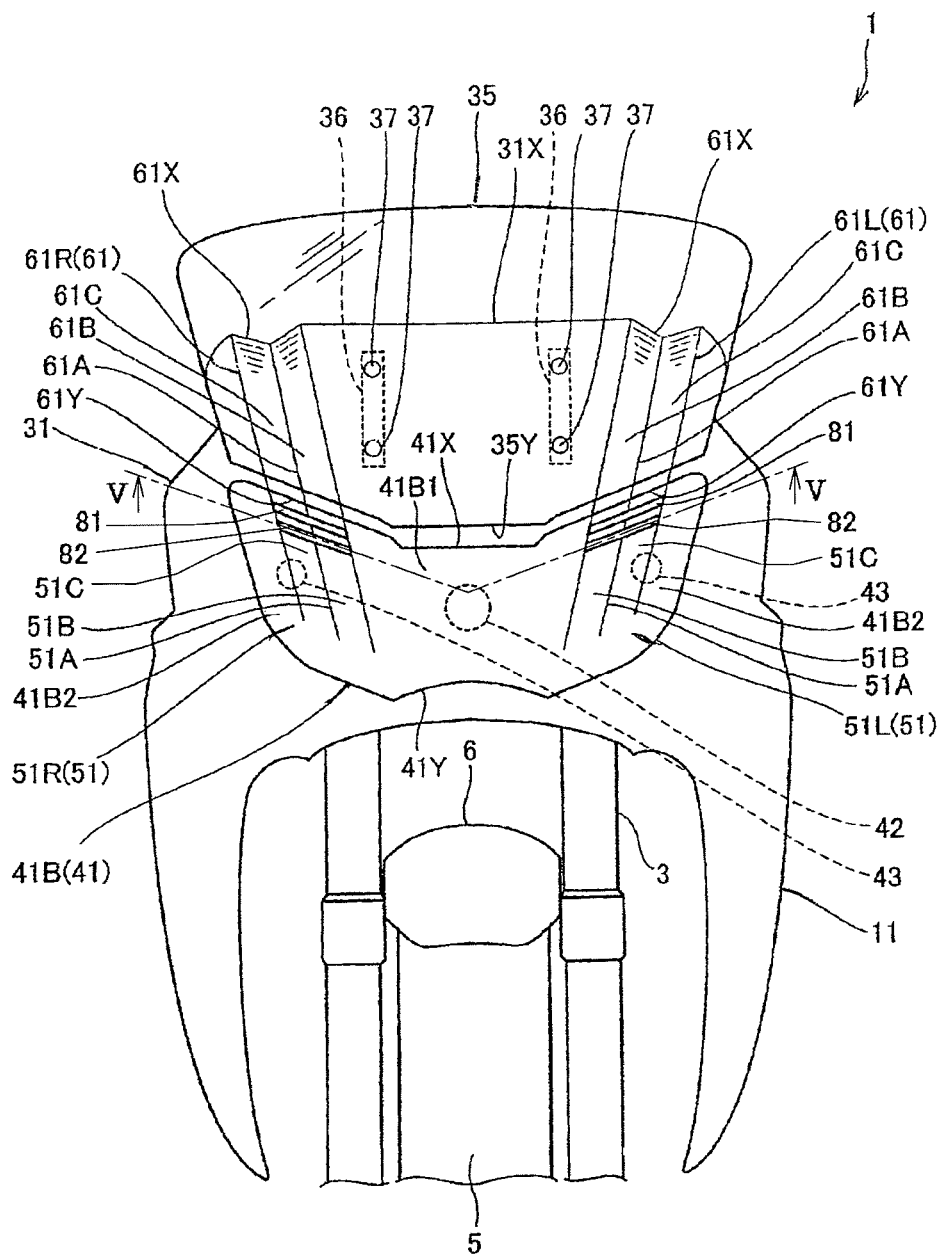
FIG. 4 is a front view showing a front cowl providing for description of a second embodiment, along with its surrounding construction.
Figure 5:
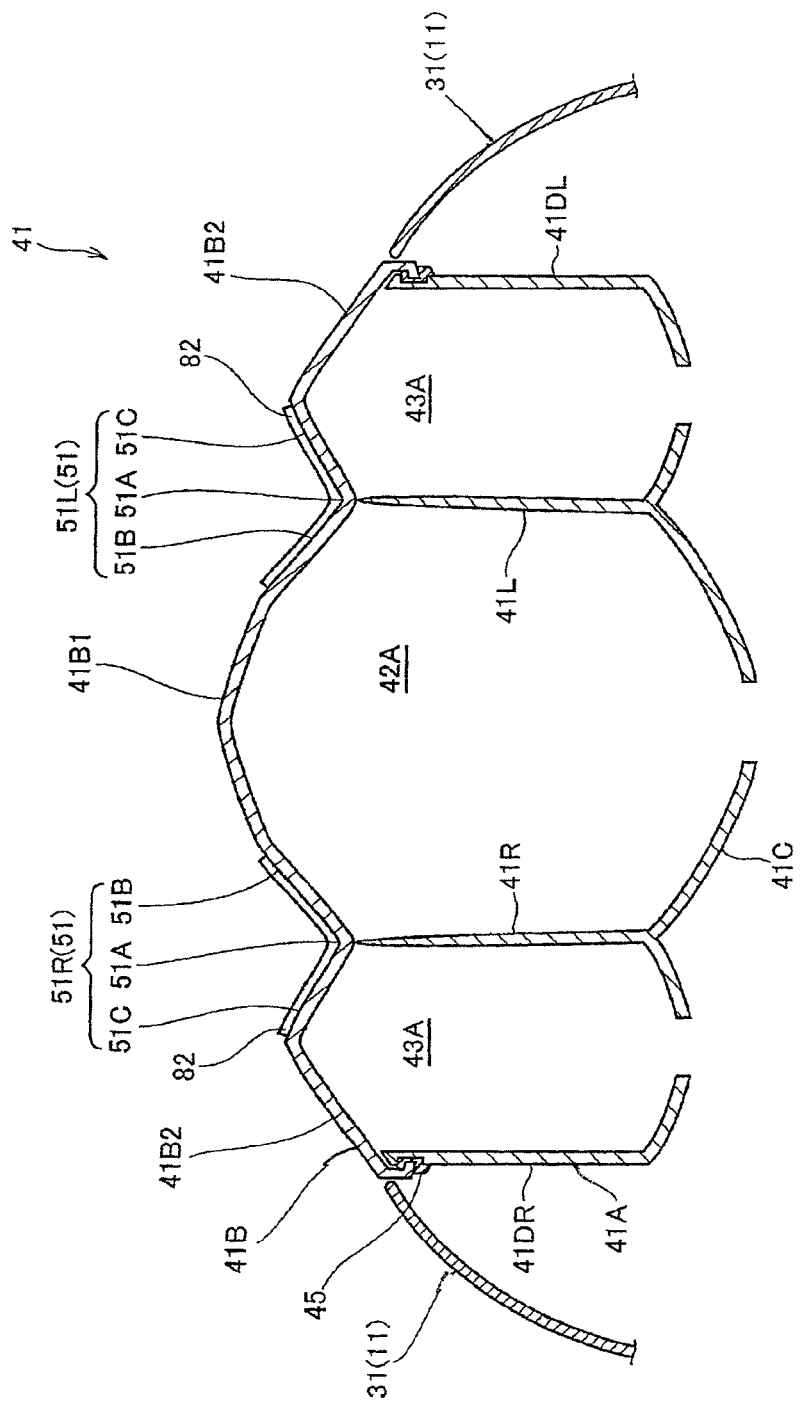
FIG. 5 is a cross-sectional view taken along line V-V of FIG. 2.

FIGS. 4 and 5 show a second embodiment.

Meanwhile, the same construction as the aforementioned embodiment is given the same reference characters, and so a detailed description thereof will be omitted.

In the second embodiment, the left and right lens-side recess portions 51 are integrally formed with ribs (water cutoff ribs) 81 and 82 that protrude from the surfaces (front surfaces) thereof.

These ribs 81 and 82 are integrally formed when the lens 41B is formed of a resin, and are vertically provided in a pair. As shown in FIG. 4, the upper ribs 81 are formed as projecting ribs that are adjacent to the upper edges of the lens-side recess portions 51 and extend throughout the width of each lens-side recess portion 51, and the lower ribs 82 are formed as projecting ribs that extend throughout the width of each lens-side recess portion 51 below the upper ribs 81.

Further, as shown in FIG. 5, the ribs 81 and 82 are formed as ribs of a predetermined height (corresponding to an amount of forward protrusion), which do not block all of the lens-side recess portions 51, secure a flow of air passages into the lens-side recess portions 51, and cause rainwater mixed into the flow of air to no longer flow upwardly. In the present construction, the ribs 81 and 82 are formed so as to extend along the lens-side recess portions 51 in a V-shape.

According to this construction, it is possible to perform water cutoff of the flow of air flowing along the lens-side recess portions 51 in an upward direction (the side of the windscreen 35) due to the ribs 81 and 82. Furthermore, since the pair of upper and lower ribs 81 and 82 is provided, it is possible to check a drop of water, which has not been checked by one rib 82, by means of the other rib 81, and improve reliability of the water cutoff. Further, the ribs 81 and 82 function as reinforcement ribs for reinforcing the lens 41B to make it possible to sufficiently secure rigidity of the lens 41B.

Thereby, it is possible to provide the ribs 81 and 82 for water cutoff with a simple construction without increasing the number of parts and without incurring large additional costs.

Further, the shape of the ribs 81 and 82 is not limited to the V shape, and thus various shapes may be applied within a range capable of securing the flow of air passage and performing water cutoff.

Figure 6:
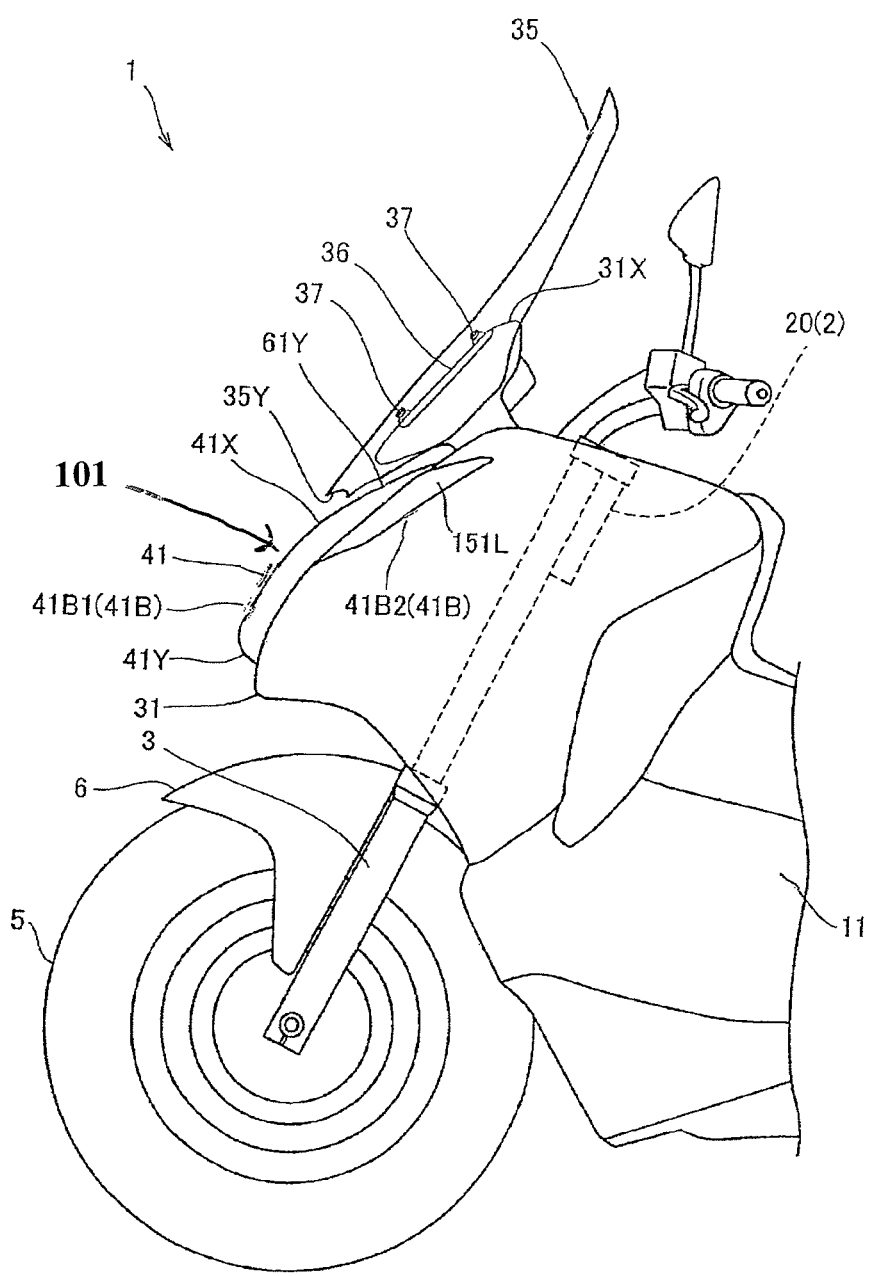
FIG. 6 is a side view showing the front portion of a motorcycle according to a third embodiment.
Figure 7:
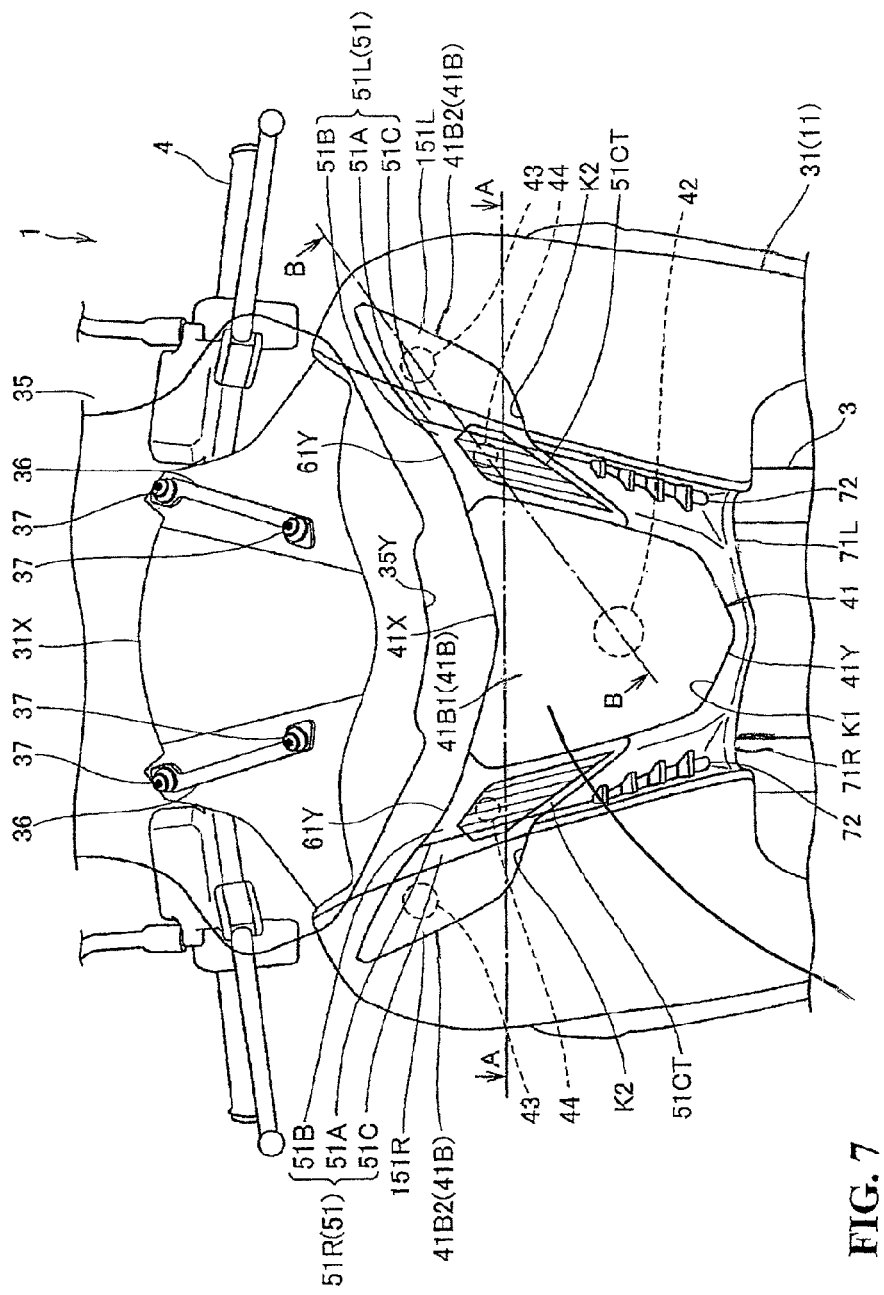
FIG. 7 is a front view showing a front cowl along with its surrounding construction.

FIG. 6 is a side view showing the front portion of a motorcycle 1 according to a third embodiment of the saddle-ride type vehicle of the present invention, and FIG. 7 is a front view showing a front cowl 31 along with its surrounding construction. Further, the same construction as the aforementioned embodiment is given the same sign, and so detailed description thereof will be omitted.

A front cowl 31 of the motorcycle 1 is provided with a headlight 41 at the center of a vehicle width direction of the front surface thereof. A windscreen 35 is installed on an upper portion of the front cowl 31 which corresponds to an upper side of the headlight 41.

The headlight 41 is made up of a combination lamp (hereinafter, referred to as a "combi-lamp") 101, which includes a headlamp 42 that is a lighting body illuminating the front at the center of the vehicle width direction, a pair of left and right blinker lamps 43 that are lighting bodies for blinkers, and a lens 41B that continues to the front of the lamps 42 and 43.

The combi-lamp 101 is not only close to a lower edge 35Y of the windscreen 35 on a lower side of the windscreen 35, but also extends upwardly at an angle from the left and right along the lower edge 35Y. The combi-lamp 101 is formed as a transversely long light having a substantially V-shape when viewed from the front.

The combi-lamp 101 is disposed in alignment of the center of the width direction thereof with the center of the vehicle width direction, and extends left and right from the center of the vehicle width direction on the front surface of the front cowl 31 when viewed from the front of the vehicle body. The lens 41B continues on almost the same surface as the front surface of the front cowl 31, and the front surface of the front cowl 31 is formed into one surface (flush surface).

The combi-lamp 101 includes a single headlamp 42 at the center of the vehicle width direction, a pair of left and right blinker lamps 43 at positions that are separated from the center of the headlamp 42 in a horizontal direction, and a pair of left and right position lamps (side marker lamps) 44 between the headlamp 42 and the blinker lamps 43.

The lens 41B of the combi-lamp 101 is provided with a pair of left and right lens-side recess portions 51L and 51R, which are recessed in the rearward direction of the vehicle and extend in a vertical direction, in front of the blinker lamps 43 as well as on an inner side of the vehicle width direction. For this reason, the lens-side recess portions 51L and 51R continue to lower open ends 61Y of the cowl-side recess portions 61 that form the gap between the front cowl 31 and the windscreen 35. When the vehicle body is being operated, the flow of air from the front of the vehicle body flows through the left and right lens-side recess portions 51L and 51R and then between the front cowl 31 and the windscreen 35, so that it can be smoothly introduced into a space of the rear side of the windscreen 35.

Figure 8:
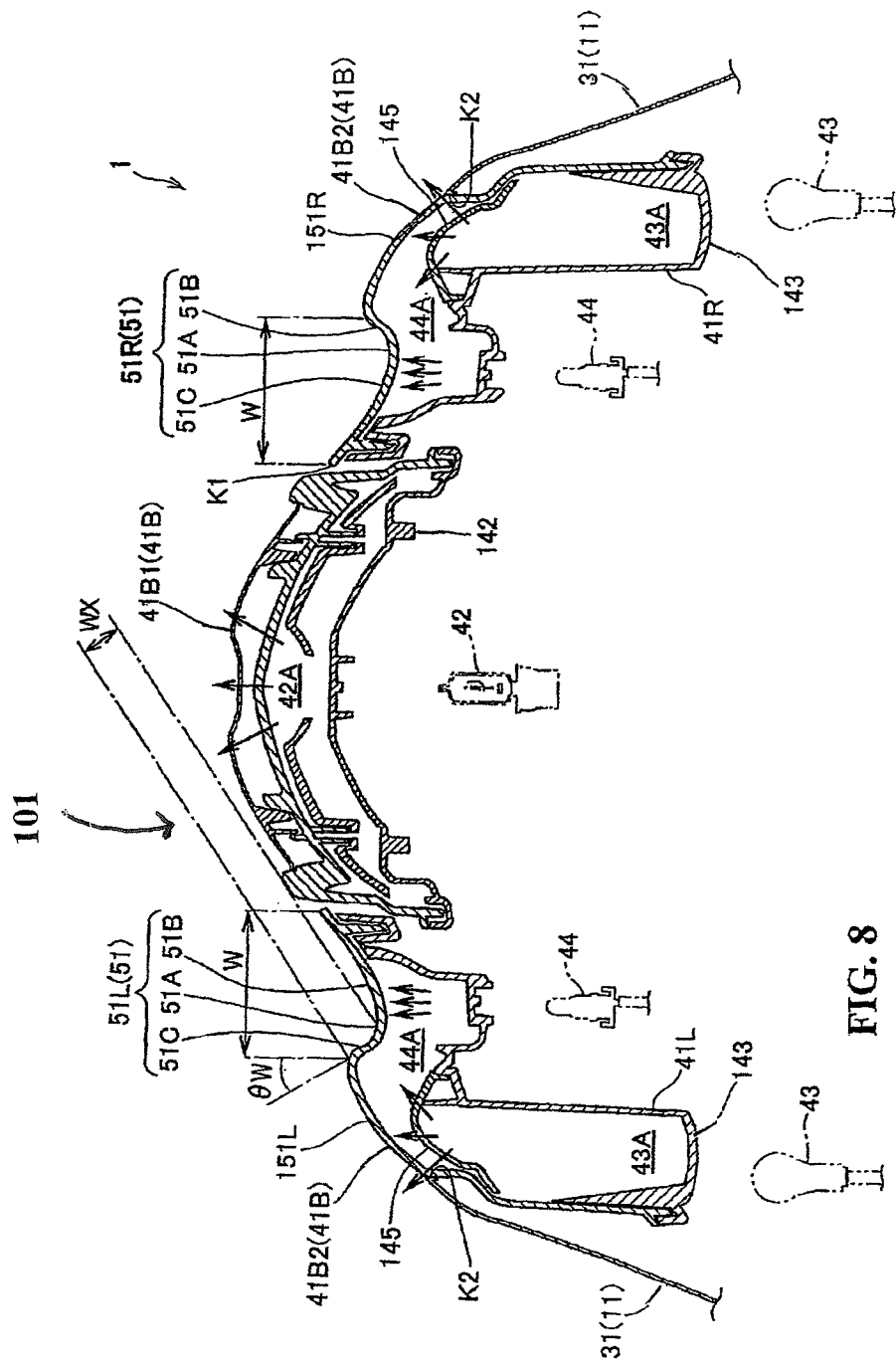
FIG. 8 is a cross-sectional view taken along line A-A of FIG. 7.
Figure 9:
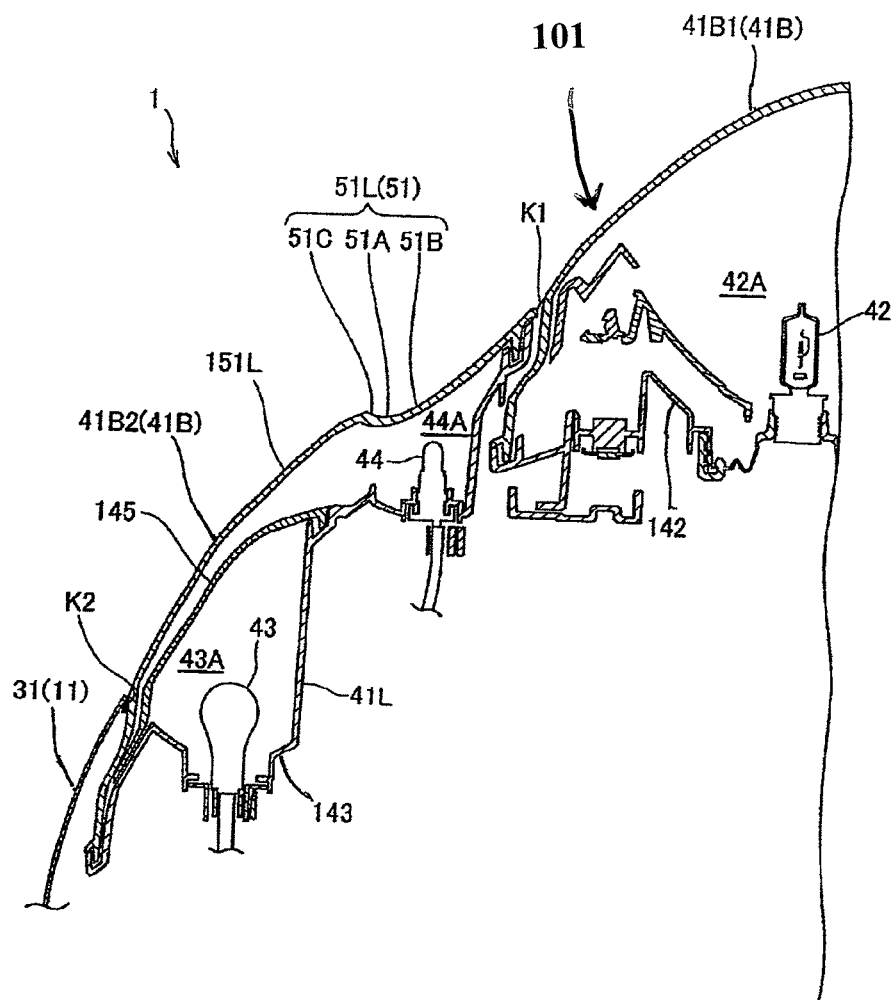
FIG. 9 is a cross-sectional view taken along line B-B of FIG. 7.

FIG. 8 is a cross-sectional view taken along line A-A of FIG. 7, and FIG. 9 is a cross-sectional view taken along line B-B of FIG. 7. Meanwhile, in FIG. 8, to help better understand the description, the position of each of the headlamp 42, the blinker lamps 43 and the position lamps 44 is indicated by a phantom line (long dashed double-short dashed line).

As shown in FIGS. 8 and 9, the combi-lamp 101 independently includes a resin headlamp-side housing 142 in which the headlamp 42 is mounted, and resin blinker-side housings 143 in which the blinker lamps 43 and the position lamps 44 are mounted.

The front cowl 31 is provided with an opening K1 for the headlamp 42 in the center thereof. The headlamp-side housing 142, in which the headlamp 42 is mounted, is mounted on a rear side of the opening K1 by fastening members not shown. The front cowl 31 is provided with openings K2 for the blinker and position lamps on the left and right sides thereof, respectively. The blinker-side housings 143, in which the blinker and position lamps 43 and 44 are mounted, are mounted on a rear side of the opening K2 by fastening members not shown. Accordingly, the openings K1 and K2 of the front cowl 31 are covered from the rear side thereof by the housings 142 and 143 of the lamps 42 to 44, respectively.

The housings 142 and 143 have reflector surfaces (planes of reflection) formed on their front surfaces by, for instance, aluminum deposition, so that they can reflect irradiation light of the lamps 42 to 44 to irradiate it toward the front of the vehicle body, etc. with high efficiency. Further, the irradiation range of each of the lamps 42 to 44 can be properly adjusted by the reflector surface.

The lens 41B of the combi-lamp 101 is formed of a transparent resin (or glass), and is composed of a central lens part 41B1, which covers the front of the headlamp-side housing 142 in which the headlamp 42 is mounted, and left and right outer lens parts 41B2, which cover the front of the blinker-side housings 143 in which the blinker and position lamps 43 and 44 are mounted.

The central lens part 41B1 and the outer lens parts 41B2 are independent of each other, but are regarded as an integrated lens in appearance because an outer edge (edge portion of the outside of the vehicle width direction) of the central lens part 41B1 is in close contact with outer edges (edge portions of the inside of the vehicle width direction) of the outer lens parts 41B2, as shown in FIG. 7.

More specifically, in the present construction, the headlamp 42, the headlamp-side housing 142, and the central lens part 41B1 constitute a headlamp unit, and the blinker and position lamps 43 and 44, the blinker-side housings 143, and the outer lens parts 41B2 constitute blinker and position lamp units. These lamp units are integrally disposed, thereby constituting the combi-lamp 101.

For this reason, it is possible to miniaturize each part constituting the combi-lamp 101. Moreover, the headlamp unit and the blinker and position lamp units are independently mounted and dismounted freely and thus, assembly and maintenance capabilities are improved.

Further, as shown in FIGS. 8 and 9, an inner lens 145, which is formed of a transparent resin (or glass), is disposed in front of each blinker lamp 43. The inner lens 145 is mounted in the blinker-side housing 143 so as to separate between the blinker lamp 43 and the outer lens part 41B2. The inner lens 145 undergoes lens cut not shown, prevents the blinker lamp 43 from being directly visible from the exterior, and adjusts directionality, etc. of the irradiation light of the blinker lamp.

In this manner, the inner lenses 145 for blinkers only are provided, and are changed in color or cut shape. Thereby, it is possible to change the design of blinkers, and improve the degree of freedom in design of the blinkers.

Further, in the present construction, a space between the inner lens 145 and the outer lens part 41B2 is used as a position lamp chamber 44A in which the position lamp 44 is held.

The central lens part 41B1 has a front end located at the center of the vehicle width direction, and is formed on a forwardly swollen slope that is rearwardly widened from the front end thereof toward the outside of the vehicle width direction.

Further, each outer lens part 41B2 is formed on a slope that is rearwardly widened toward the outside of the vehicle width direction along the shape of the central lens part 41B1.

To be more specific, the outer lens parts 41B2 are constructed so that, centering the partition walls 41L and 41R of the blinker lamps 43 which extend on the inner side of the vehicle width direction, the lens parts (51L and 51R) of the inner side of the vehicle width direction are formed at a pair of left and right lens-side recess portions 51L and 51R that are recessed toward the rear of the vehicle and extend in a vertical direction, and lens parts 151L and 151R of the outer side of the vehicle width direction are formed on slopes that are rearwardly widened toward the outside of the vehicle width direction.

When viewed from the horizontal cross section, each of the pair of left and right lens-side recess portions 51L and 51R has a V-shaped cross-sectional groove whose width is as narrow as the rear side of the vehicle body (see FIGS. 8 and 9), and provided throughout a vertical width of the blinker chamber 43A in which the blinker lamp 43 is held (see FIG. 7).

Each of the pair of left and right lens-side recess portions 51L and 51R includes an inner slanted portion (first slanted portion) 51B, which is inclined from an innermost portion 51A located on the rearmost side of the vehicle body toward the inner side of the vehicle width direction as well as the front and forms an inner slope (first slope) connected to the central lens part 41B1, and an outer slanted portion (second slanted portion) 51C, which is inclined from an innermost portion 51A toward the outer side of the vehicle width direction as well as the front and forms an outer slope (second slope) connected to the outer lens part 151L or 151R.

For this reason, as indicated by the solid line arrows for the irradiation light in FIG. 8, the irradiation light of the headlamp 42 is irradiated in the forward direction (including an anterolateral direction) through the central lens part 41B1. Further, the irradiation light of the left and right blinker lamps 43 is emitted in various directions, for instance, reflected on the inner reflector surfaces of the blinker-side housings 143, and irradiated from a substantially entire surface of the inner lenses 145.

In detail, as shown in FIG. 8, the irradiation light passing through the inner lenses 145 includes irradiation light directed in the forward direction, irradiation light directed to the outside of the vehicle width direction, and irradiation light directed to the inside of the vehicle width direction. Among them, the irradiation light directed in the forward direction and the irradiation light directed to the outside of the vehicle width direction are irradiated to the outside of the vehicle through the left and right outer lens parts 41B2, and the irradiation light directed to the inside of the vehicle width direction irradiated to the outside of the vehicle through the outer slanted portions 51C of the left and right lens-side recess portions 51.

Further, irradiation light of the position lamps 44 is irradiated forwardly through the inner and outer slanted portions 51B and 51C of the left and right lens-side recess portions 51.

In the case of this irradiation, since each inner lens 145 forms a forwardly swollen lens surface widened in the horizontal direction, it is possible to set an irradiation range of the blinker lamp 43 to be wide in the horizontal direction and effectively scatter the light of the blinker lamp.

Furthermore, since each of the left and right outer lens parts 41B2 is wider than the inner lens 145 in the vehicle width direction, it does not obstruct the irradiation of the blinker lamp's light from the inner lens 145. Thereby, it is possible to set the irradiation range of the blinker lamp 43 to be wide in the horizontal direction.

In addition, even in the left and right outer lens part 41B2, forwardly swollen lens surfaces widened in the horizontal direction can be formed by the lens-side recess portions 51L and 51R, and thereby the irradiation range of the blinker lamp 43 is easily set to be wide in the horizontal direction, and the irradiation range of the position lamp 44 is easily set to be wide in the horizontal direction. Accordingly, it is possible to effectively scatter the light of the blinker lamps and the position lamps, and improve visibility from surroundings.

The reference character WX in FIG. 8 indicates the irradiation range of the left blinker lamp 43 by the lens-side recess portion 51L. As shown in FIG. 8, the light of the blinker lamp passes through the outer slanted portion 51C of the left lens-side recess portion 51L, and then is irradiated at an angle in a rightward and forward direction of the motorcycle 1 without being blocked by the front cowl 31 including the central lens part 41B1. Thereby, the slanted irradiation range of the rightward and forward direction of the motorcycle 1 becomes wide.

Figure 10:
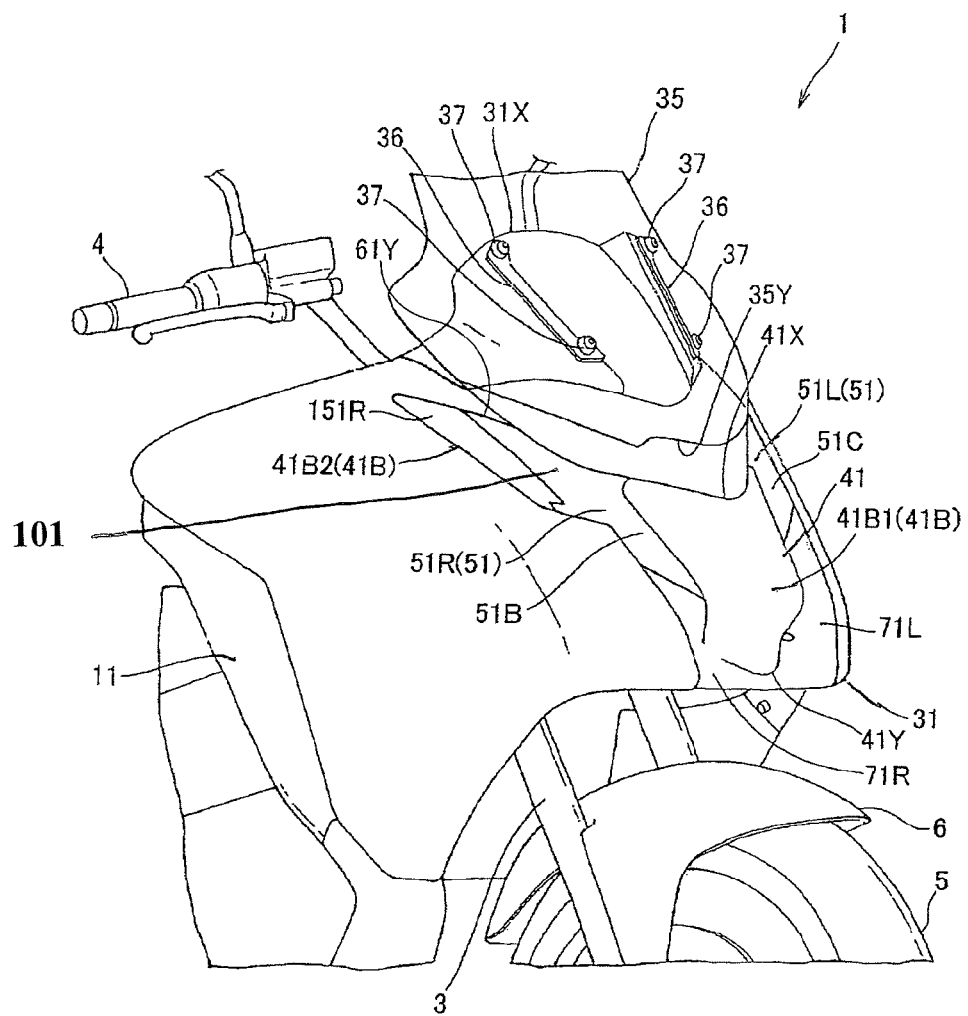
FIG. 10 is a perspective view showing a front cowl along with its surrounding construction.

As shown in FIG. 10, the outer slanted portion 51C of the left lens-side recess portion 51L is visible from a position that is slightly in front of the vicinity of the right side of the front cowl 31 of the motorcycle 1. For this reason, as shown in FIG. 10, a third person who is located just beside the right side of the front cowl 31 can see the light of the left blinker lamp which is irradiated from the outer slanted portion 51C. That is, the left blinker is visible from the right side of the motorcycle 1, and it is possible to improve the visibility of the blinker.

Furthermore, since a front portion structure of the motorcycle 1 is symmetrical in structure, the right blinker is visible from the left side of the motorcycle 1, and it is possible to improve the visibility of the blinker.

In this manner, in the present construction, the lens-side recess portions 51L and 51R are formed in front of the left and right blinker lamps 43 as well as the inner side of the vehicle width direction, respectively. Thereby, it is possible to improve the visibility of the blinker of one of the left and right sides of the motorcycle 1 in the slanted direction in front of the other side of the motorcycle.

More particularly, in the present construction, as shown in FIG. 8, the innermost portion 51A of the lens-side recess portion 51L or 51R is offset toward the outer side of the vehicle width direction within a width W of the lens-side recess portion 51L or 51R. For this reason, slanted angles θW of the outer slanted portions 51C are symmetrically increased in the vehicle width direction (transverse direction), and thus it is possible to improve the visibility of the blinker of one of the left and right sides in the slanted direction in front of the other side.

Further, as shown in FIG. 7, when viewed from the front of the vehicle body, since the left and right lens-side recess portions 51L and 51R extend linearly in an upward direction on the outside of the vehicle width direction, the lens-side recess portions 51L and 51R form slanted air guide recess portions that are inclined in an upward direction as well as toward the outside of the vehicle width direction. Due to this construction, it is possible to secure wide irradiation ranges of the blinker lamps 43 and the position lamps 44 in the vertical direction using the inner and outer slanted portions 51B and 51C that define the pair of slopes forming the lens-side recess portions 51. Further, since it is possible to form a band-like lens design that extends between the blinker lamp 43 and the headlamp 42 with substantially the same width, it is possible to improve appearance.

Furthermore, as shown in FIG. 7, the inner slanted portions 51B of the left and right lens-side recess portions 51 undergo lens cuts 51CT. The pair of left and right lens cuts 51CT prevent the position lamps 44 from being directly visible from the exterior and adjustment of directionality of the position lamps 44. Thereby, when the position lamps 44 are turned off (i.e., when the vehicle is stopped), it is possible to achieve a simple design in which the position lamps 44 are not visible from the exterior.

As described above, the present embodiment has a structure in which the lens-side recess portions 51L and 51R as concavities which are recessed toward the rear of the vehicle and extend in a vertical direction, are formed in front of the blinker lamps 43 as well as on the inner side of the vehicle width direction, and the combi-lamp 101 is also formed. As such, it is possible to improve the visibility of the blinker of one of the left and right sides of the motorcycle 1 from the other side of the motorcycle.

Further, even the first and second embodiments as described above have the same structure in that the lens-side recess portions 51L and 51R are concavities, which are recessed toward the rear of the vehicle and extend in a vertical direction in front of the blinker lamps 43 as well as on the inner side of the vehicle width direction (see FIGS. 3 and 5), and have a structure in which the combi-lamp 101 is also formed. As such, it is possible to improve the visibility of the blinker of one of the left and right sides of the motorcycle 1 from the other side of the motorcycle.

Moreover, in the present embodiment, air can be sufficiently guided to the rear side of the windscreen 35 by the lens-side recess portions 51L and 51R. As such, as in the first and second embodiments as described above, it is possible to increase the light emitting area of the headlight 41 and secure the freedom of the shape and layout of the headlight 41 without restricting any of the light emitting area, shape, layout, etc. of the headlight 41.

Further, in the present embodiment, as shown in FIGS. 7 and 10, the front cowl 31 is provided with cowl-side recess portions 71L and 71R, which vertically extend from the lower edges of the left and right lens-side recess portions 51L and 51R and are recessed toward the rear of the vehicle body. The flow of air from the front of the vehicle body can be smoothly introduced into the lens-side recess portions 51L and 51R by the cowl-side recess portions 71L and 71R.

For this reason, it is possible to guide the flow of air more smoothly to the rear side of the windscreen 35. Further, the cowl-side recess portions 71L and 71R are provided with air guide holes 72 passing in forward and rearward directions. The flow of air can be introduced into the front cowl 31 by the air guide holes 72.

Further, since the lens-side recess portions 51L and 51R are formed throughout the vertical width of the blinker chambers 43A in which the blinker lamps 43 are held, it is possible to longitudinally prolong the light emitting surface of the blinker as long as possible, and further enhance visibility.

Furthermore, the lens-side recess portions 51L and 51R have the V-shaped cross section formed with a width that decreases as they extend toward the rear of the vehicle, and the innermost portions 51A located in the rear of the vehicle body are each offset toward the outside of the vehicle width direction within the entire width of each of the lens-side recess portions 51L and 51R, it is possible to incline the outer slanted portions 51C of the lens-side recess portions 51L and 51R toward the inner side (transverse direction) of the vehicle width direction to the utmost, and further improve the visibility of the blinker of one of the left and right sides from the other side.

Furthermore, since the position lamps 44 are installed on the rear of the lens-side recess portions 51L and 51R, it is possible to effectively use dead spaces of the rear of the lens-side recess portions 51L and 51R.

As shown in FIG. 9, the dead spaces of the rear of the lens-side recess portions 51L and 51R are spaces that are short in length in the forward and rearward directions because the lens-side recess portions 51L and 51R are recessed in the rearward direction. However, since the position lamps 44 will suffice even if they are smaller than the other lamps 42 and 43, the dead spaces can be sufficiently used as the spaces of the position lamps 44. For this reason, it is not necessary to separately secure the spaces of the position lamps 44, and it is possible to provide a small combi-lamp 101 having the headlamp 42, the blinker lamps 43 and the position lamps 44.

Figure 11:
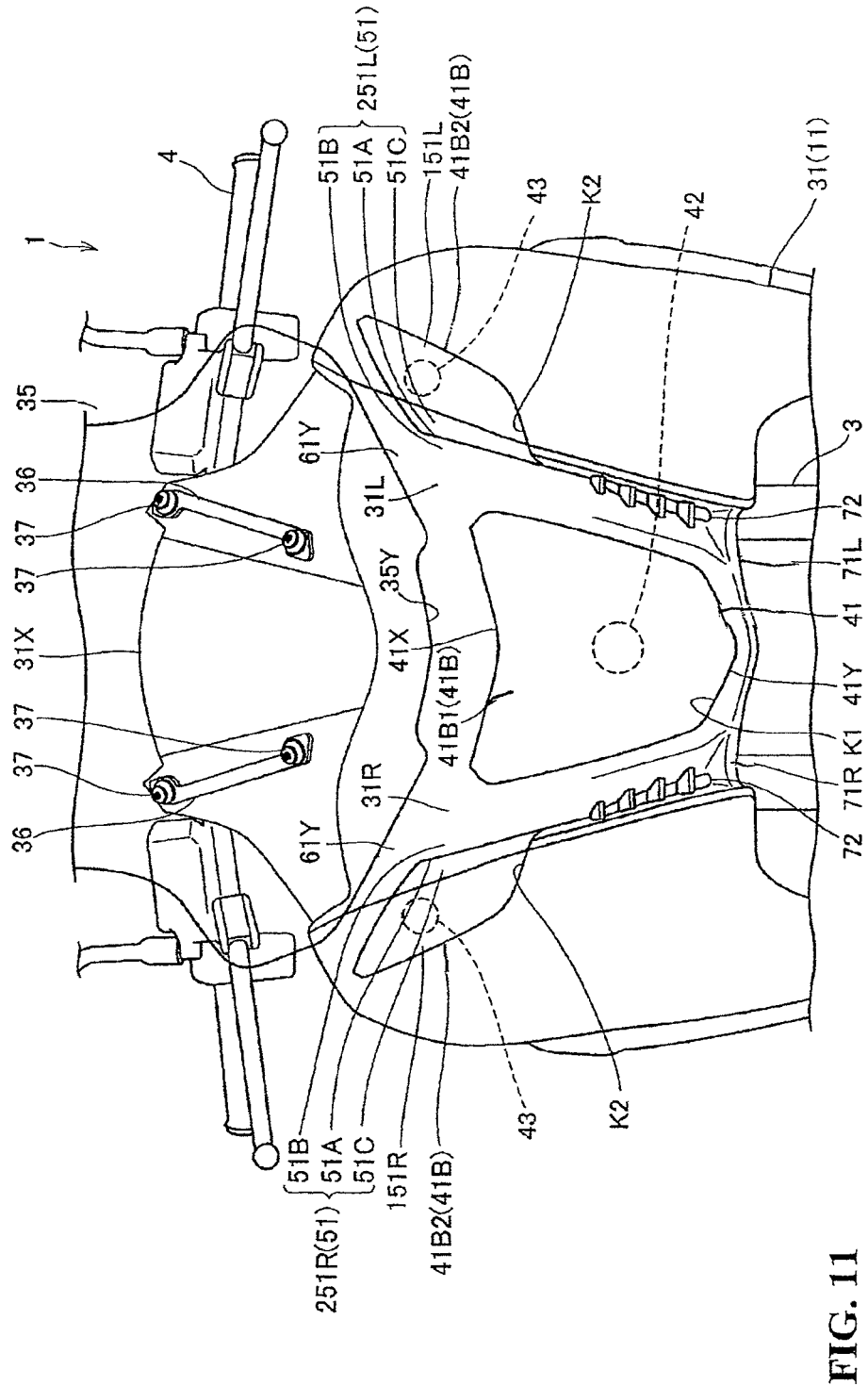
FIG. 11 is a front view showing a front cowl providing for description of a fourth embodiment, along with its surrounding construction.

FIG. 11 is a front view of a motorcycle 1 according to a fourth embodiment. Further, the same construction as the aforementioned embodiment is given the same sign, and so detailed description thereof will be omitted.

In the motorcycle 1, a front cowl 31 is exposed between a headlamp 42 and blinker lamps 43 in a vertical direction. The exposed portions (front cover portions 31L and 31R) of the front cowl 31 and outer lens parts 41B2 that are lenses covering the blinker lamps 43 are provided with a pair of left and right recess portions 251L and 251R as concavities which are recessed toward the rear of the vehicle and extend in the vertical direction, in front of the blinker lamps 43 as well as on the inner side of the vehicle width direction.

To be specific, the front cowl 31 includes a pair of left and right front cover portions 31L and 31R that are vertically exposed between the headlamp 42 and the blinker lamps 43 in a band shape.

A headlight 41 is provided with a single headlamp 42 and a central lens part 41B1 covering the front of the headlamp 42 between the pair of left and right front cover portions 31L and 31R. A pair of left and right blinker lamps 43 and a pair of left and right outer lens parts 41B2 covering the front of the blinker lamps 43 are provided on the outer side of the vehicle width direction of the pair of left and right front cover portions 31L and 31R.

Further, the headlight 41 forms a combi-lamp 101 having the headlamp 42 and the blinker lamps 43 by disposing the central lens part 41B1 and the outer lens parts 41B2 so as to be adjacent to each other, and is constructed without the position lamps 44 of the third embodiment.

As shown in FIG. 11, boundaries between the pair of left and right front cover portions 31L and 31R and the outer lens parts 41B2 form innermost portions 51A located on the rearmost side of the vehicle body. Each of the front cover portions 31L and 31R includes an inner slanted portion (first slanted portion) 51B, which is inclined from the innermost portion 51A toward the inner side of the vehicle width direction as well as the front and forms an inner slope (first slope) connected to the central lens part 41B1.

Each outer lens part 41B2 is provided with an outer slanted portion (second slanted portion) 51C, which is inclined from the innermost portion 51A toward the outer side of the vehicle width direction as well as the front and forms an outer slope (second slope) connected to the outer lens part 151L or 151R.

Accordingly, a pair of left and right recess portions 251L and 251R is defined by the inner slanted portions 51B of the front cover portions 31L and 31R and the outer slanted portions (second slanted portions) 51C of the outer lens parts 41B2.

In this manner, the pair of left and right recess portions 251L and 251R, which are recessed toward the rear of the vehicle and extend in a vertical direction, are formed in front of the blinker lamps 43 as well as on the inner side of the vehicle width direction by the front cowl 31 and the outer lens parts 41B2 covering the blinker lamps 43. As such, even when the front cowl 31 is constructed to be exposed between the headlamp 42 and the blinker lamps 43, it is possible to improve the visibility of the blinker of one of the left and right sides of the motorcycle 1 from the other side of the motorcycle, and to more smoothly perform the air guide to the rear side of the windscreen 35. In this way, it is possible to produce the same various effects as the aforementioned embodiments.

The aforementioned embodiments are merely illustrative of one aspect of the present invention, and may be arbitrarily modified and applied within the scope without departing from the gist of the present invention.

For example, the aforementioned embodiments have been described regarding the case where the present invention is applied to the front portion structure of the motorcycle 1 shown in, for instance, FIG. 1. However, not being limited to this application, the present invention can be widely applied to a front portion structure of a saddle-ride type vehicle. Further, the saddle-ride type vehicle includes all vehicles for straddle-riding on a vehicle body and may be a motorcycle (including a bicycle with a motor) as well as a three-wheeled vehicle, a four-wheeled vehicle or the like classified as an ATV (all terrain vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front portion structure of a vehicle, comprising:
a front cowl covering a front portion of a vehicle body;
a windscreen installed at an upper portion of the front cowl and extending rearwardly and upwardly; and
a headlight including a lens, lighting bodies, and a housing and disposed below the windscreen wherein a gap guiding the flow of air is formed between the front cowl and the windscreen;
wherein the lens of the headlight includes recess portions integrally formed with ribs that protrude from and traverse across surfaces of the recess portions, said recess portions being recessed towards a rear of the vehicle, and provided so as to continue to the lower open ends of the gap between the front cowl and the windscreen, wherein the recess portions are provided on left and right sides of the lens, said front cowl including cowl-side recess portions that are recessed so as to continue to the recess portions of the headlight, forming the gap between the front cowl and the windscreen, and extend rearwardly and upwardly;
said headlight being a combination lamp having a headlamp illuminating a front and left and right blinker lamps; and
a headlamp chamber in which the headlamp is positioned and blinker chambers in which the left and right blinker lamps are partitioned by partition walls integrally formed with the housing respectively with left and right recess portions being provided so as to follow the partition walls.

2. A front portion structure of a vehicle, comprising:
a front cowl covering a front portion of a vehicle body;

a windscreen installed at an upper portion of the front cowl and extending rearwardly and upwardly; and a headlight including a lens, lighting bodies, and a housing and disposed below the windscreen wherein a gap guiding the flow of air is formed between the front cowl and the windscreen;

wherein the lens of the headlight includes recess portions recessed towards a rear of the vehicle, said recess portions being provided so as to continue to lower open ends of the gap between the front cowl and the windscreen, said the recess portions formed in the lens are integrally formed with ribs that protrude from and traverse across the surfaces of the recess portions, wherein the recess portions are provided on left and right sides of the lens.

3. A front portion structure of a vehicle, comprising:

a front cowl covering a front portion of a vehicle body;

a windscreen installed at an upper portion of the front cowl and extending rearwardly and upwardly; and a headlight including a lens, lighting bodies, and a housing and disposed below the windscreen wherein a gap guiding the flow of air is formed between the front cowl and the windscreen;

wherein the lens of the headlight includes recess portions recessed towards a rear of the vehicle, said recess portions being provided so as to continue to lower open ends of the gap between the front cowl and the windscreen, wherein the recess portions are provided on left and right sides of the lens and the recess portions formed in the lens are integrally formed with ribs that protrude from and traverse across the surfaces of the recess portions;

said headlight being a combination lamp having a headlamp illuminating a front and left and right blinker lamps; and a headlamp chamber in which the headlamp is positioned and blinker chambers in which the left and right blinker lamps are positioned are partitioned by partition walls integrally formed with the housing respectively with left and right recess portions being provided so as to follow the partition walls.

4. A front portion structure of a vehicle, comprising:

a front cowl covering a front portion of a vehicle body;

a windscreen installed at an upper portion of the front cowl and extending rearwardly and upwardly; and a headlight including a lens, lighting bodies, and a housing and disposed below the windscreen wherein a gap guiding the flow of air is formed between the front cowl and the windscreen;

wherein the lens of the headlight includes recess portions recessed towards a rear of the vehicle, said recess portions being provided so as to continue to lower open ends of the gap between the front cowl and the windscreen, wherein the recess portions formed in the lens are integrally formed with ribs that protrude from and traverse across the surfaces of the recess portions;

wherein the front cowl includes cowl-side recess portions that are recessed so as to continue to the recess portions of the headlight, forming the gap between the front cowl and the windscreen, and extending rearwardly and upwardly.

* * * * *